Patented Dec. 15, 1931

1,836,295

UNITED STATES PATENT OFFICE

KARL THIESS AND BERNHARD DEICKE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

CYCLOHEXYLAMINE CONDENSATION PRODUCTS

No Drawing. Application filed October 11, 1929, Serial No. 399,087, and in Germany March 28, 1928.

The present invention relates to new condensation products. More particularly, it relates to the new compounds of the following general formula:

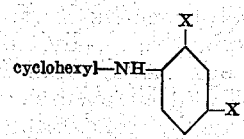

wherein one X represents $NO_2$ or $NH_2$, the other X being hydrogen, halogen, a sulfonic or a carboxylic acid group. The compounds of the above given general formula are obtainable, for instance, by condensing any cyclohexylamine, viz. a compound of the constitution of the cyclohexylamine, whose hydrogen atoms linked to a C-atom may be substituted or not, such as, for instance, cyclohexylamine, metyl cyclohexylamine or the like, with a compound of the following general formula:

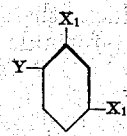

wherein Y represents an exchangeable halogen atom, one $X_1$ being $NO_2$, the other $X_1$ being hydrogen, halogen, a sulfonic or a carboxylic acid group, and reducing, if desired, the nitro compounds, thus obtained, to the corresponding amino compounds.

The condensation is preferably conducted in the presence of an acid binding agent and a carrier such as, for instance, copper powder or a copper salt. In some cases the reaction can be accelerated by working in a pressure vessel.

Part of our new compounds are dyestuffs. All of them are valuable starting materials for the preparation of other new products and dyestuffs. The condensation product from cyclohexylamine and 1-chloro-4-nitrobenzene-2-sulfonic acid, for instance, yields, after being reduced, a product from which, for instance, by further condensation with 1-chloro-2.4-dinitrobenzene or with 1-chlorodinitronaphthalene, acid wool dyestuffs can be obtained. From the nitrophenyl-cyclohexylamine sulfonic acids obtainable according to our invention the sulfo groups may be split off whereby after reduction hitherto undescribed aminoaryl-cyclohexylamines are obtained.

The following examples serve to illustrate our invention but they are not intended to limit it thereto, the parts being by weight unless otherwise stated.

1. 19.8 parts of cyclohexylamine are heated in a reflux apparatus for about 3 hours with 20 parts of 1-chloro-2.4-dinitro-benzene in 200 parts by volume of alcohol. The condensation product separates in the form of yellow crystals. It is insoluble in water and can be obtained from alcohol in the form of yellow lamellæ of the melting point 154° C. It is readily soluble in benzene and acetone, sparingly soluble in alcohol.

In a similar manner the 1-N-cyclohexylamino-4-chloro-2-nitrobenzene of the melting point 104° C. is obtained from the 1.4 dichloro-2-nitrobenzene by heating it in an autoclave with cyclohexylamine.

2. By replacing in Example 1 the 1-chloro-2.4-dinitro-benzene by the equivalent quantity of 1-chloro-2.4-dinitro-naphthalene, a yellowish-red condensation product is obtained which is very sparingly soluble in alcohol.

3. 10 parts of cyclohexylamine are dissolved together with 26 parts of 1-chloro-4-nitrobenzene-2-sodium sulfonate with addition of 6 parts of calcined sodium carbonate in 200 parts of water and boiled in a reflux apparatus for 12 to 14 hours. On cooling the new product precipitates in the form of yellow crystals. The portion which remains in solution can be obtained by salting it out.

When recrystallizing the product from water greenish-yellow crystals are obtained which dye wool and acetate silk yellow tints. In concentrated sulfuric acid the product dissolves to a colorless solution.

4. 10 parts of cyclohexylamine are dissolved together with 32 parts of potassium 1-chloro-2.6-dinitro-benzene-4-sulfonate with addition of 6 parts of calcined sodium carbonate in 200 parts of water and boiled in a reflux apparatus for about 8 hours. A reddish-yellow powder is obtained which, when redissolved in hot water, crystallizes out in the form of reddish-yellow laminæ. In cold sulfuric acid the product dissolves to a colorless solution, which when heated turns yellow. It dyes wool in an acid solution yellow tints.

5. 100 parts of the condensation product obtainable according to Example 3 from cyclohexylamine and 1-chloro-4-nitrobenzene-2-sodium sulfonate are dissolved in about 1000 parts of water and reduced in neutral solution in the usual manner at about 70° C. to 80° C. with previously cauterized iron. The reduction mass rendered alkaline by the addition of sodium carbonate is filtered by suction and the solution is neutralized by means of hydrochloric acid. The 1-N-cyclohexylamino-4-nitrobenzene-2-sulfonic acid thus obtained precipitates in the form of a white sandy powder. It dissolves sparingly in water but readily in alkalies and warm dilute hydrochloric acid. When adding ferric chloride to its aqueous solution, it first assumes a reddish-violet coloration which after some time turns blue.

6. 10 parts of cyclohexylamine are dissolved together with 26 parts of 1-chloro-4-nitrobenzene-2-sodium sulfonate with the addition of 6 parts of calcined sodium carbonate and 0.2 part of copper powder in 250 parts of water and the solution is boiled in a reflux apparatus for about 7 to 8 hours. The product obtained is identical with that described in Example 3.

7. 10 parts of cyclohexylamine are dissolved together with 26 parts of 1-chloro-4-nitrobenzene-2-sodium sulfonate with the addition of 6 parts of calcined sodium carbonate in 300 parts of water. The solution is heated in a pressure vessel for about 6 hours up to a temperature of about 135° C. to 140° C. The resulting product is identical with that obtained according to Example 3.

The 1-N-cyclohexylamine-4-nitrobenzene-2-carboxylic acid melting at about 253° C. with decomposition can be obtained in an analogous manner by condensing cyclohexylamine with 1-chloro-4-nitrobenzene-2-carboxylic acid.

8. 10 parts of hexahydroaniline are boiled in a reflux apparatus for about 40 hours with about 200 parts of water, 23.8 parts of 1-chloro-2-nitrobenzene-4-sulfonic acid and 12 parts of sodium carbonate and the solution thus obtained is filtered while hot so as to eliminate small quantities of impurities. On cooling the 1-N-cyclohexylamino-2-nitro-benzene-4-sodium sulfonate precipitates from the filtrate in the form of golden-yellow crystals.

The condensation product dyes wool and silk very even brilliant yellow tints.

Other condensation products such as, for instance, 1-N-cyclohexylamino-2.4-dinitrobenzene-6 sulfonic acid of the melting point 240° C. can be obtained in an analogous manner. The sodium salt of the sulfonic acid melts at about 260° C. and dyes wool and silk very even reddish-yellow tints.

9. 32.2 parts of the 1-N-cyclohexylamino-4-nitrobenzene-2 sodium sulfonate obtainable according to Example 3 are dissolved in 22 parts of hot water. The solution is mixed with about 20 parts of concentrated sulfuric acid and heated for about 5 hours in an autoclave up to about 130° C. After cooling the resultant yellow crystals are filtered by suction. After recrystallization, for example, from ligroin they melt at 100° C. and constitute the 1-N-cyclohexyl-amino-4-nitrobenzene.

In a similar manner the 1-N-cyclohexylamino-2-nitrobenzene of the melting point 104° C. can be obtained from the 1-N-cyclohexylamino-2-nitrobenzene-4-sulfonic acid obtainable by condensing cyclohexylamine with 1-chloro-2-nitrobenzene-4-sulfonic acid and the 1-N-cyclohexylamino-2.4-dinitrobenzene of the melting point 154° C. from the 1-N-cyclohexylamino-2.4 - dinitrobenzene - 6 - sulfonic acid obtainable by condensing cyclohexylamine with 1-chloro-2.4-dinitrobenzene-6-sulfonic acid.

Instead of sulfuric acid, hydrochloric acid or other water-containing mineral acids may be used in order to split off the sulfo group. Also the concentration of the acids and the temperature may vary within wide limits.

By reducing the nitro derivatives described in the present specification according to known methods the corresponding aminoaryl-cyclohexylamines are obtained.

We claim:

1. As new products, the compounds of the following general formula:

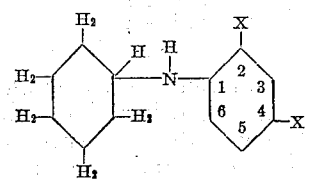

wherein one X stands for a $NO_2-$ or $NH_2-$ group, the other X for a sulfo group, being when containing a $NO_2$ group yellow, otherwise colorless products which are soluble in alkalies.

2. As new products, the compounds of the following general formula:

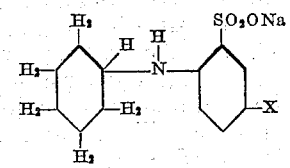

wherein X stands for a $NO_2-$ or $NH_2-$ group, being when containing a $NO_2$ group yellow, otherwise colorless products which are soluble in alkalies.

3. As a new product, the compound of the following formula:

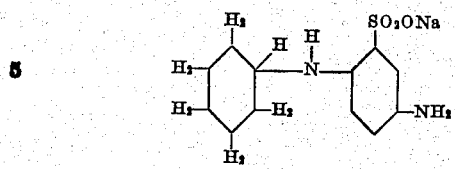

being a white powder which is sparingly soluble in water, readily soluble in alkalies and dilute hydrochloric acid and the aqueous solution of which readily turns blue on addition of iron chloride.

4. As new products, the compounds of the following general formula:

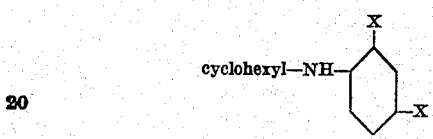

wherein one X represents $NO_2$ or $NH_2$, the other X being hydrogen, chlorine, a sulfonic or a carboxylic acid group and wherein the cyclohexyl residue may be substituted by methyl.

5. As new products, the compounds of the following general formula:

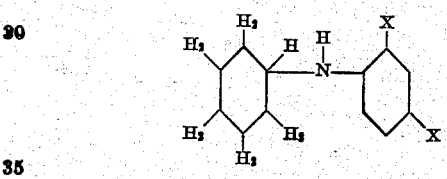

wherein one X represents $NO_2$ or $NH_2$, the other X being hydrogen, chlorine, a sulfonic or a carboxylic acid group.

In testimony whereof, we affix our signatures.

KARL THIESS.
BERNHARD DEICKE.